US012659960B2

(12) United States Patent
Li

(10) Patent No.: US 12,659,960 B2
(45) Date of Patent: Jun. 16, 2026

(54) METHOD AND APPARATUS FOR DETERMINING PUCCH RESOURCE, AND TERMINAL

(71) Applicant: VIVO MOBILE COMMUNICATION CO., LTD., Chang'an Dongguan (CN)

(72) Inventor: Na Li, Chang'an Dongguan (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 223 days.

(21) Appl. No.: 18/477,931

(22) Filed: Sep. 29, 2023

(65) Prior Publication Data

US 2024/0023108 A1     Jan. 18, 2024

Related U.S. Application Data

(63) Continuation of application No. PCT/CN2022/083246, filed on Mar. 28, 2022.

(30) Foreign Application Priority Data

Apr. 1, 2021    (CN) .......................... 202110358084.6

(51) Int. Cl.
*H04W 72/21*     (2023.01)
*H04L 1/1812*     (2023.01)
*H04W 72/11*     (2023.01)

(52) U.S. Cl.
CPC ........... *H04W 72/21* (2023.01); *H04L 1/1812* (2013.01); *H04W 72/11* (2023.01)

(58) Field of Classification Search
CPC . H04W 72/21; H04W 72/11; H04W 72/1273; H04W 72/0446; H04L 1/1812;
(Continued)

(56) References Cited

U.S. PATENT DOCUMENTS

| | | | |
|---|---|---|---|
| 12,068,863 B2 | 8/2024 | Li et al. | |
| 12,082,187 B2 | 9/2024 | Papasakellariou | |

(Continued)

FOREIGN PATENT DOCUMENTS

| | | |
|---|---|---|
| CN | 111106903 A | 5/2020 |
| CN | 111262663 A | 6/2020 |

(Continued)

OTHER PUBLICATIONS

WO_2020221271_A1 (Year: 2020).*
(Continued)

*Primary Examiner* — Rushil P. Sampat
(74) *Attorney, Agent, or Firm* — Price Heneveld LLP

(57) ABSTRACT

A method and apparatus for determining PUCCH resource and a terminal are disclosed, which relate to the field of wireless communication technologies. The method for determining PUCCH resource in embodiments of this application includes: in a case that multiple SPS PDSCHs are configured or activated on the terminal and feedback information corresponding to at least one target SPS PDSCH in the multiple SPS PDSCHs needs to be reported in one same time unit, determining a first target PUCCH resource, where the first target PUCCH resource is used for transmitting the feedback information corresponding to the target SPS PDSCH.

20 Claims, 5 Drawing Sheets

400

S410

In a case that multiple SPS PDSCHs are configured or activated on a terminal and feedback information corresponding to at least one target SPS PDSCH in the multiple SPS PDSCHs needs to be reported in one same time unit, determine a first target PUCCH resource

S420

In a case that feedback information corresponding to the multiple target SPS PDSCHs needs to be reported in one same time unit, construct a first target codebook according to a predetermined manner

(58) Field of Classification Search

CPC ... H04L 5/0055; H04L 1/0003; H04L 1/1614; H04L 1/1854; H04L 1/1861; H04L 1/1896; H04L 1/0009; H04L 1/0016

See application file for complete search history.

(56) References Cited

U.S. PATENT DOCUMENTS

| | | | |
|---|---|---|---|
| 12,224,866 | B2 | 2/2025 | Papasakellariou |
| 12,375,220 | B2 | 7/2025 | Yao et al. |
| 12,463,783 | B2 | 11/2025 | Papasakellariou |
| 2020/0374089 | A1 | 11/2020 | Yang et al. |
| 2022/0007399 | A1* | 1/2022 | Rastegardoost ...... H04L 1/1861 |
| 2022/0052799 | A1 | 2/2022 | Li et al. |
| 2022/0061076 | A1* | 2/2022 | Ma .................... H04W 72/0446 |
| 2022/0399978 | A1* | 12/2022 | Gao ...................... H04L 5/0055 |
| 2023/0135551 | A1* | 5/2023 | Gao ...................... H04L 1/1812 |
| | | | 370/329 |
| 2023/0354330 | A1* | 11/2023 | Lin ................... H04W 72/1273 |

FOREIGN PATENT DOCUMENTS

| | | |
|---|---|---|
| CN | 112584512 A | 3/2021 |
| WO | 2020221271 A1 | 11/2020 |
| WO | 2021028531 A1 | 2/2021 |
| WO | 2021033116 A1 | 2/2021 |

OTHER PUBLICATIONS

WO_2021088494_A1 (Year: 2021).*

OPPO: "HARQ-ACK Enhancements for REL-17 URLLC/IIoT," 3GPP TSG RAN WG1 #104-e, R1-2100181, e-Meeting, Jan. 25-Feb. 5, 2021.

Moderator (Nokia): "Moderator Summary #2 on HARQ-ACK Feedback Enhnacements for NR REL-17 URLLC/IIoT," 3GPP TSG-RAN WG1 Meeting #104-e, R1-2101818, e-Meeting, Jan. 25-Feb. 5, 2021.

Indian Examination Report for Appln. No. 202317074448 dated May 8, 2026, 11 pages.

* cited by examiner

12

11          11

200

S210

In a case that multiple SPS PDSCHs are configured or activated
on a terminal and feedback information corresponding to at least
one target SPS PDSCH in the multiple SPS PDSCHs needs to be
reported in one same time unit, determine a first target PUCCH
resource

Figures 3, 4:
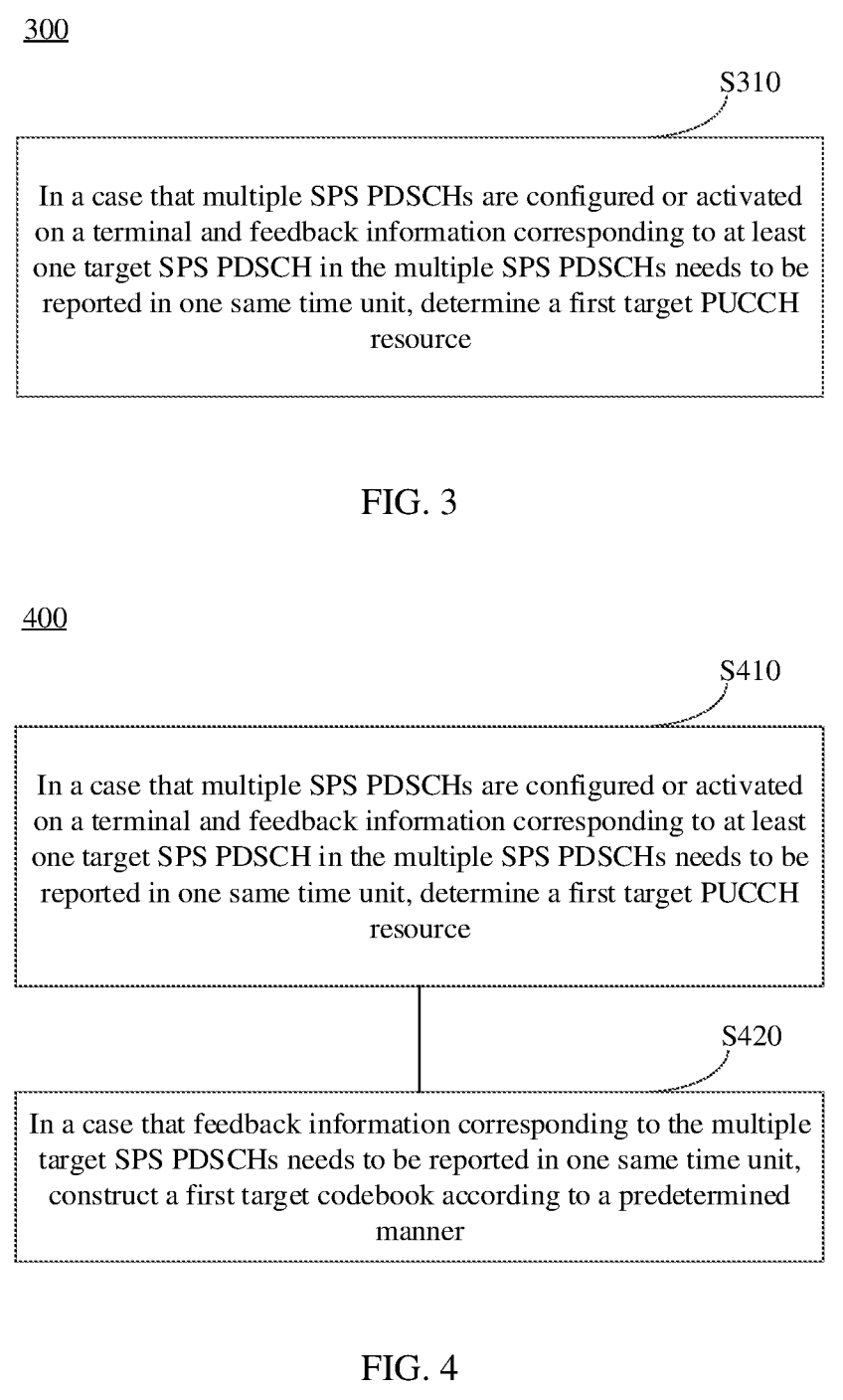

300

S310

In a case that multiple SPS PDSCHs are configured or activated on a terminal and feedback information corresponding to at least one target SPS PDSCH in the multiple SPS PDSCHs needs to be reported in one same time unit, determine a first target PUCCH resource

In a case that multiple SPS PDSCHs are configured or activated on a terminal and feedback information corresponding to at least one target SPS PDSCH in the multiple SPS PDSCHs needs to be reported in one same time unit, determine a first target PUCCH resource

S420

In a case that feedback information corresponding to the multiple target SPS PDSCHs needs to be reported in one same time unit, construct a first target codebook according to a predetermined manner

METHOD AND APPARATUS FOR DETERMINING PUCCH RESOURCE, AND TERMINAL

CROSS-REFERENCE TO RELATED APPLICATIONS

This application is continuation application of PCT International Application No. PCT/CN2022/083246 filed on Mar. 28, 2022, which claims priority to Chinese Patent Application No. 2021103580846, filed with the China National Intellectual Property Administration on Apr. 1, 2021 and entitled "METHOD AND APPARATUS FOR DETERMINING PUCCH RESOURCE, AND TERMINAL", which is incorporated herein by reference in its entirety.

TECHNICAL FIELD

This application relates to the field of wireless communication technologies, and specifically, to a method and apparatus for determining PUCCH resource and a terminal.

BACKGROUND

In multicast broadcast service (MBS), a terminal is capable of supporting multiple semi-persistent scheduling (SPS) physical downlink shared channels (PDSCH), such as SPS group-common PDSCHs and SPS unicast PDSCHs. However, during transmission of feedback information, it may be necessary to report feedback information corresponding to multiple SPS PDSCHs in one given time unit, making it difficult for the terminal to determine feedback resources to be used for feedback information transmission, thereby affecting performance of the wireless communication system.

SUMMARY

According to a first aspect, a method for determining PUCCH resource is provided. The method is performed by a terminal and the method includes: in a case that multiple SPS PDSCHs are configured or activated on the terminal and feedback information corresponding to at least one target SPS PDSCH in the multiple SPS PDSCHs needs to be reported in one same time unit, determining a first target PUCCH resource, where the first target PUCCH resource is used for transmitting the feedback information corresponding to the target SPS PDSCH.

According to a second aspect, an apparatus for determining PUCCH resource is provided. The apparatus includes a determining module configured to: in a case that multiple SPS PDSCHs are configured or activated and feedback information corresponding to at least one target SPS PDSCH in the multiple SPS PDSCHs needs to be reported in one same time unit, determine a first target PUCCH resource, where the first target PUCCH resource is used for transmitting the feedback information corresponding to the target SPS PDSCH.

According to a third aspect, a terminal is provided. The terminal includes a processor, a memory, and a program or instructions stored in the memory and capable of running on the processor, and when the program or instructions are executed by the processor, the steps of the method according to the first aspect are implemented.

According to a fourth aspect, a terminal is provided, including a processor and a communication interface. The communication interface is coupled to the processor, and the processor is configured to run a program or instructions to implement the method according to the first aspect.

According to a fifth aspect, a readable storage medium is provided. The readable storage medium stores a program or instructions, and when the program or instructions are executed by a processor, the steps of the method according to the first aspect are implemented.

According to a sixth aspect, a chip is provided. The chip includes a processor and a communication interface, the communication interface is coupled to the processor, and the processor is configured to run a program or instructions to implement the steps of the method according to the first aspect.

According to a seventh aspect, a program product/computer program product is provided. The program product/computer program product is stored in a non-volatile storage medium, and the program product/computer program product is executed by at least one processor to implement the steps of the method according to the first aspect.

BRIEF DESCRIPTION OF DRAWINGS

FIG. 3 is a schematic flowchart of a method for determining PUCCH resource according to an example embodiment of this application;

FIG. 4 is a schematic flowchart of a method for determining PUCCH resource according to an example embodiment of this application;

DETAILED DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

The terms "first", "second", and the like in this specification and claims of this application are used to distinguish between similar objects rather than to describe a specific order or sequence. It should be understood that terms used in this way are interchangeable in appropriate circumstances so that the embodiments of this application can be implemented in other orders than the order illustrated or described herein. In addition, "first" and "second" are usually used to distinguish objects of a same type, and do not restrict a quantity of objects. For example, there may be one or a plurality of first objects. In addition, "and/or" in the specification and claims represents at least one of connected objects, and the character "/" generally indicates that the associated objects have an "or" relationship.

It should be noted that technologies described in the embodiments of this application are not limited to a long term evolution (LTE) or LTE-Advanced (LTE-A) system, and may also be applied to other wireless communications systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are often used interchangeably, and the technology described herein may be used in the above-mentioned systems and radio technologies as well as other systems and radio technologies. In the following descriptions, a new radio (NR) system is described for an illustration purpose, and NR terms are used in most of the following descriptions, although these technologies may also be applied to other applications than an NR system application, for example, the 6th generation (6G) communications system.

Figures 1, 2:
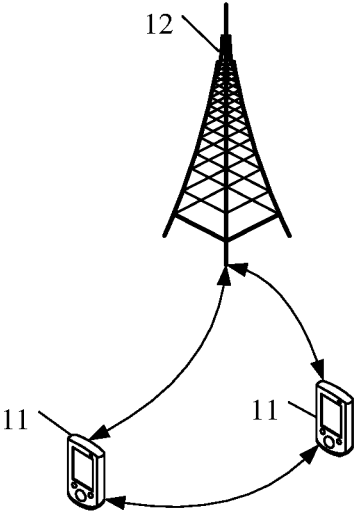
FIG. 1 is a schematic structural diagram of a wireless communication system according to an example embodiment of this application.
FIG. 2 is a schematic flowchart of a method for determining PUCCH resource according to an example embodiment of this application.

FIG. 1 is a schematic structural diagram of a wireless communications system to which an embodiment of this application may be applied. The wireless communications system includes a terminal 11 and a network-side device 12. The terminal 11 may also be referred to as a terminal device or user equipment (UE), and the terminal 11 may be a terminal-side device, such as a mobile phone, a tablet computer (Tablet Personal Computer), a laptop computer or a notebook computer, a personal digital assistant (PDA), a palmtop computer, a netbook, an ultra-mobile personal computer (UMPC), a mobile Internet device (MID), a wearable device or vehicle user equipment (VUE), or pedestrian user equipment (PUE). The wearable device includes a smart watch, a wrist band, earphones, glasses, or the like. It should be noted that the specific type of the terminal 11 is not limited in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmitting receiving point (TRP), or another appropriate term in the art. Provided that the same technical effect is achieved, the base station is not limited to a specific technical term. It should be noted that only the base station in the NR system is used as an example in the embodiments of this application, but the specific type of the base station is not limited.

The following describes in detail the technical solutions that are provided in the embodiments of this application through some embodiments and application scenarios thereof with reference to the accompanying drawings.

FIG. 2 is a schematic flowchart of a method 200 for determining PUCCH resource according to an example embodiment of this application. The method may be performed by a terminal but is not limited to that, and specifically the method can be executed by hardware and/or software installed on the terminal. In this embodiment, the method 200 may include at least the following step.

S210. In a case that multiple SPS PDSCHs are configured or activated on the terminal and feedback information corresponding to at least one target SPS PDSCH in the multiple SPS PDSCHs needs to be reported in one same time unit, determine a first target physical uplink control channel (PUCCH) resource.

It can be understood that the need to report the feedback information corresponding to the at least one target SPS PDSCH in one same time unit means determining, according to HARQ-ACK feedback timing indications (such as a value indicated in a PDSCH-to-HARQ-ACK feedback timing indication field in activation downlink control information (DCI) of the SPS PDSCH) respectively corresponding to the multiple target SPS PDSCHs, that feedback information for multiple SPS PDSCHs is to be reported in one same time unit as indicated. However, for the NACK only mode, in a case that feedback for a specified SPS PDSCH is to be reported in a given time unit as indicated, the terminal needs to transmit NACK only in the case of NACK feedback, and otherwise, it does not need to transmit its feedback information.

The configuration or activation of multiple SPS PDSCHs on the terminal can be understood as follows: the terminal can configure or activate multiple SPS PDSCHs on one or more serving cells to provide the possibility for the terminal to support multiple different service types. Optionally, each SPS PDSCH in the multiple SPS PDSCHs can be an SPS group-common PDSCH or an SPS unicast PDSCH, and correspondingly, the target SPS PDSCH can also be an SPS group-common PDSCH or an SPS unicast PDSCH, without limitation.

In addition, the first target PUCCH resource is used to transmit feedback information corresponding to the target SPS PDSCH, and the time unit can be a slot, sub-slot, symbol, symbol set, or the like.

In this embodiment, the target SPS PDSCH being an SPS group-common PDSCH is used as an example. Before reporting feedback information corresponding to at least one SPS group-common PDSCH in one same time unit, the terminal determines a HARQ feedback resource (that is, a first target PUCCH resource) corresponding to the at least one SPS group-common PDSCH. This solves the problem of the terminal being unable to clearly determine a feedback resource for feedback information transmission due to the need to report feedback information corresponding to multiple SPS PDSCHs in one given time unit, ensuring the normal reporting of feedback information and improving the performance of the wireless communication system.

It should be understood that the terminal can determine the first target PUCCH resource in various ways, such as based on identification information of the target SPS PDSCH or a HARQ feedback mode (or feedback scheme, such as feedback of HARQ-ACK/NACK) configured for the target SPS PDSCH, without limitation.

FIG. 3 is a schematic flowchart of a method 300 for determining PUCCH resource according to an example embodiment of this application. The method may be performed by a terminal, but is not limited to that and can be specifically executed by hardware and/or software installed on the terminal. In this embodiment, the method 300 may include at least the following step.

S310. In a case that multiple SPS PDSCHs are configured or activated on the terminal and feedback information corresponding to at least one target SPS PDSCH in the multiple SPS PDSCHs needs to be reported in one same time unit, determine a first target PUCCH resource.

The first target PUCCH resource is used to transmit the feedback information corresponding to the target SPS PDSCH.

It can be understood that for an implementation process of S310, reference may be made to the relevant description in the previous method embodiment 200. In addition, in a possible implementation, the implementation process of "determining a first target PUCCH resource" in S310 can include: determining the first target PUCCH resource based on a HARQ feedback mode corresponding to the target SPS PDSCH. The HARQ feedback mode can include at least one of the following (1) to (3).

(1) No feedback of HARQ information. In this mode, in a case that the terminal has received an SPS PDSCH configured with no feedback of HARQ information, the terminal does not report HARQ-ACK or HARQ-NACK corresponding to the SPS PDSCH to a network-side device.

(2) Feedback of HARQ-NACK only. In this mode, in a case that the terminal has received an SPS PDSCH configured with feedback of HARQ-NACK only, the terminal reports only HARQ-NACK corresponding to the SPS PDSCH to a network-side device.

(3) Feedback of HARQ-ACK/NACK. In this mode, in a case that the terminal receives an SPS PDSCH configured with feedback of HARQ-ACK/NACK, the terminal can report HARQ-ACK or HARQ-NACK corresponding to the SPS PDSCH to the network-side device. In one implementation, for SPS unicast PDSCH, it can be assumed that a HARQ feedback mode corresponding to the SPS unicast PDSCH is HARQ-ACK/NACK by default, without the need for configuration or indication from the network-side device.

In this embodiment, the HARQ feedback mode corresponding to the SPS PDSCH can be configured using an existing parameter in SPS-Config, such as a semiPersist-SchedC-RNTI field, or configured by adding a new RRC parameter in SPS-Config, such as HARQ-ACKFeedback {enable, disable} or HARQ-ACKFeedback {no feedback, ACK/NACK, NACK only}, or configured using other manners, without limitation.

In this case, in one implementation, to further improve the efficiency of determining the first target PUCCH resource, the terminal can be configured with a feedback resource (which can also be understood as a feedback resource list or set) for configuring a PUCCH resource corresponding to SPS PDSCH. Optionally, the feedback resource can include at least one of a first resource, a second resource, and a third resource.

The first resource is a PUCCH resource for transmitting feedback information corresponding to first SPS group-common PDSCH, where the HARQ feedback mode corresponding to the first SPS group-common PDSCH is feedback of HARQ-ACK/NACK.

The second resource is a PUCCH resource for transmitting feedback information corresponding to second SPS group-common PDSCH, where the HARQ feedback mode corresponding to the second SPS group-common PDSCH is feedback of HARQ-NACK only.

The third resource is a PUCCH resource for transmitting feedback information corresponding to SPS unicast PDSCH.

It should be noted that for the aforementioned first resource, second resource, and third resource, taking the first resource as an example, one or more PUCCH resources can be configured in the first resource, and each PUCCH resource in the first resource can be dedicated to transmitting feedback information corresponding to a specified SPS PDSCH or can be used to transmit feedback information corresponding to each SPS PDSCH configured with a specified HARQ feedback mode, without limitation.

Based on the aforementioned HARQ feedback modes and feedback resources, a process of the terminal determining the first target PUCCH resource according to the HARQ feedback mode corresponding to the target SPS PDSCH can be implemented in any one of the following ways 1 to 3.

Way 1: In a case that the HARQ feedback mode corresponding to the target SPS PDSCH is feedback of HARQ-ACK/NACK and the target SPS PDSCH is an SPS group-common PDSCH, the first target PUCCH resource is determined based on the number of bits of the HARQ-ACK/NACK corresponding to the target SPS PDSCH.

For example, the terminal can determine the first target PUCCH resource from one or more PUCCH resources configured in the first resource, based on the number of bits of the HARQ-ACK/NACK corresponding to the target SPS PDSCH.

Way 2: In a case that the HARQ feedback mode corresponding to the target SPS PDSCH is feedback of HARQ-NACK only and the target SPS PDSCH is an SPS group-common PDSCH, a first PUCCH resource is determined as the first target PUCCH resource.

The first PUCCH resource is a PUCCH resource configured for the target SPS PDSCH. In other words, the first PUCCH resource is dedicated to transmitting the feedback information corresponding to the target SPS PDSCH. In this embodiment, the first PUCCH resource can be defined by protocol or configured by a network-side device (such as a base station). For example, it can be configured through a parameter n1 PUCCH-AN under SPS-config, without limitation.

Way 3: In a case that the HARQ feedback mode corresponding to the target SPS PDSCH is feedback of HARQ-NACK only and the target SPS PDSCH is an SPS group-common PDSCH, a second PUCCH resource is determined as the first target PUCCH resource.

The second PUCCH resource is used to transmit feedback information for any SPS group-common PDSCH configured with feedback of HARQ-NACK only. In other words, feedback information corresponding to each SPS group-common PDSCH configured with feedback of HARQ-NACK only can be transmitted via the second PUCCH resource. In this embodiment, the second PUCCH resource can be defined by protocol or configured by a network-side device (such as a base station). For example, it can be configured through a parameter SPS-PUCCH-NACKOnly-r17 or SPS-PUCCH-NOnly-r17, without limitation.

It can be understood that in the aforementioned way 2 and way 3, the first PUCCH resource and the second PUCCH resource can be selected from resources configured in the aforementioned first resource, second resource, and third resource, or can be different from the resources configured in the aforementioned first resource, second resource, and third resource, without limitation.

Further, after determining the first target PUCCH resource based on the HARQ feedback mode corresponding to the target SPS PDSCH, the terminal can further transmit the feedback information corresponding to the target SPS PDSCH using the first target PUCCH resource. However, feedback information corresponding to multiple target SPS PDSCHs may need to be transmitted in one same time unit, which may lead to transmission conflicts. For example, multiple target SPS PDSCHs (such as SPS group-common PDSCHs) are transmitted in one same time unit, with some of the SPS group-common PDSCHs configured with a HARQ feedback mode of feedback of HARQ-NACK only and some of the SPS group-common PDSCHs configured with a HARQ feedback mode of feedback of HARQ-ACK/NACK. In other words, the terminal needs to report both ACK/NACK and NACK in one same time unit. In this case, it is necessary to consider how should the terminal perform transmission. In this embodiment, the transmission process is explained in conjunction with the following example 1 to example 3.

Example 1

In a case that the terminal needs to report the feedback information corresponding to the multiple target SPS PDSCHs in one same time unit, and the HARQ feedback mode corresponding to each of the target SPS PDSCHs is feedback of HARQ-NACK only, the terminal can perform any one of the following (1) to (3).

(1) In a case that any target SPS PDSCH in the multiple target SPS PDSCHs requires NACK feedback, reporting NACK based on the first target PUCCH resource, where the first target PUCCH resource is a PUCCH resource configured for the target SPS PDSCH that requires NACK feedback. In other words, the first target PUCCH resource is dedicated to transmitting feedback information corresponding to the target SPS PDSCH that requires NACK feedback. Alternatively, the first target PUCCH resource is used to transmit feedback information for any SPS group-common PDSCH configured with feedback of HARQ-NACK only. In other words, feedback information corresponding to each SPS group-common PDSCH configured with feedback of HARQ-NACK only can be transmitted via the first target PUCCH resource.

For example, in a case that any one of target SPS PDSCHs requires NACK feedback, each target SPS PDSCH has its own PUCCH resource (that is, the first target PUCCH resource) for reporting NACK, and the terminal determines which PUCCH resource is to be used to report NACK. In this case, it means that NACK corresponding to the target SPS PDSCH is reported, and when performing blind detection on multiple PUCCH resources, the base station can determine, based on a PUCCH resource on which the NACK is detected, a target SPS PDSCH for which the terminal has reported NACK.

For another example, in a case that any one of multiple target SPS PDSCHs requires NACK feedback, and all the target SPS PDSCHs share the same PUCCH resource (that is, the first target PUCCH resource) to report NACK, feedback information corresponding to any one of the target SPS PDSCHs is NACK, and the terminal reports each NACK on this PUCCH resource. In this case, the base station detects on this PUCCH whether the terminal reports NACK, and when detecting NACK on the PUCCH resource, the base station can determine that NACK is reported for at least one of these target SPS PDSCHs but cannot determine which SPS PDSCH corresponds to the NACK.

(2) In a case that only one SPS PDSCH in the multiple target SPS PDSCHs requires NACK feedback, reporting NACK based on a first target PUCCH resource corresponding to the SPS PDSCH that requires NACK feedback.

(3) In a case that at least two SPS PDSCHs in the multiple target SPS PDSCHs require NACK feedback, reporting NACK corresponding to a first specified SPS PDSCH based on a first target PUCCH resource corresponding to the first specified SPS PDSCH, where the first specified SPS PDSCH is determined, based on first information, from the at least two SPS PDSCHs that require NACK feedback, or the first specified SPS PDSCH is any one of the at least two target SPS PDSCHs that is determined by the terminal.

Optionally, in a case that the first specified SPS PDSCH is determined based on first information from at least two SPS PDSCHs that require NACK feedback, the first information can include at least one of priority information of SPS PDSCH, priority information of feedback information for SPS PDSCH, service priority information corresponding to SPS PDSCH, configuration index information corresponding to SPS PDSCH, index information of service cell where SPS PDSCH is located, and reception time information of SPS PDSCH.

For example, in a case that the first information includes priority information of SPS PDSCH, the first specified SPS PDSCH can be an SPS PDSCH with the highest SPS PDSCH priority in the at least two SPS PDSCHs. It should be understood that in a case that the first information is priority information of feedback information for SPS PDSCH, service priority information corresponding to SPS PDSCH, or configuration index information corresponding to SPS PDSCH, determination of the first specified SPS PDSCH is similar to that in the case of priority information of SPS PDSCH, and details are not described herein again.

For another example, in a case that the first information includes priority information of SPS PDSCH and service priority information corresponding to SPS PDSCH, and at least two SPS PDSCHs include SPS PDSCH1, SPS PDSCH2, and SPS PDSCH3, the first specified SPS PDSCH can be selected from SPS PDSCH1, SPS PDSCH2, and SPS PDSCH3 based on the priority information of SPS PDSCH. In a case that the first specified SPS PDSCH has been selected, the service priority information corresponding to SPS PDSCH is not considered. Otherwise, the first specified SPS PDSCH can be further selected from SPS PDSCH1, SPS PDSCH2, and SPS PDSCH3 based on the service priority information corresponding to SPS PDSCH. It should be understood that in a case that the first information includes at least two of priority information of SPS PDSCH, priority information of feedback information for SPS PDSCH, service priority information corresponding to SPS PDSCH, configuration index information corresponding to SPS PDSCH, index information of a service cell where the SPS PDSCH is located, and reception time information of SPS PDSCH, selection of the first specified SPS PDSCH is similar to the foregoing description, and details are not described herein again.

Example 2

In a case that the at least one target SPS PDSCH includes a first SPS PDSCH and a second SPS PDSCH, and feedback information corresponding to the first SPS PDSCH and feedback information corresponding to the second SPS PDSCH need to be reported in one same time unit, the terminal performs at least one of the following (1) to (5).

(1) Reporting HARQ-ACK/NACK corresponding to the first SPS PDSCH based on a first target PUCCH resource corresponding to the first SPS PDSCH. A HARQ feedback mode corresponding to the first SPS PDSCH is feedback of HARQ-ACK/NACK, and a HARQ feedback mode corresponding to the second SPS PDSCH is feedback of HARQ-NACK only.

For example, even if an SPS group-common PDSCH (that is, the second SPS PDSCH) configured with reporting NACK only (that is, only HARQ-NACK is reported) corresponds to NACK, the terminal does not report the NACK corresponding to the SPS group-common PDSCH. In other words, the terminal reports only HARQ-ACK/NACK corresponding to an SPS group-common PDSCH (that is, the first SPS PDSCH) configured with reporting ACK/NACK.

(2) Reporting HARQ-NACK corresponding to the second SPS PDSCH based on the first target PUCCH resource corresponding to the second SPS PDSCH. A HARQ feed-back mode corresponding to the first SPS PDSCH is feed-back of HARQ-ACK/NACK, and a HARQ feedback mode corresponding to the second SPS PDSCH is feedback of HARQ-NACK only.

For example, in a case that an SPS group-common PDSCH (that is, the second SPS PDSCH) configured with reporting NACK only corresponds to NACK, the terminal reports the NACK corresponding to the SPS group-common PDSCH but does not report HARQ-ACK/NACK for an SPS group-common PDSCH (that is, the first SPS PDSCH) configured with feedback of HARQ-ACK/NACK.

(3) Reporting feedback information corresponding to a second specified SPS PDSCH based on a first target feed-back resource corresponding to the second specified SPS PDSCH. The second specified SPS PDSCH is determined from the first SPS PDSCH and the second SPS PDSCH based on the second information. A HARQ feedback mode corresponding to the first SPS PDSCH is feedback of HARQ-ACK/NACK, and a HARQ feedback mode corre-sponding to the second SPS PDSCH is feedback of HARQ-NACK only.

For related description of the second information, refer-ence may be made to the previous description about the first information. To avoid repetition, details are not repeated herein.

For example, assuming that the second information is priority information of SPS PDSCH, in a case that an SPS group-common PDSCH (that is, the second SPS PDSCH) configured with reporting NACK only corresponds to NACK, but a priority of the SPS group-common PDSCH is lower than a priority of any/at least one SPS group-common PDSCH (that is, the first SPS PDSCH) configured with reporting ACK/NACK, the terminal reports HARQ-ACK for the SPS group-common PDSCH configured with report-ing ACK/NACK. Otherwise, the terminal reports NACK for an SPS group-common PDSCH configured with reporting NACK only.

(4) In a case that feedback information corresponding to the second SPS PDSCH is not NACK, reporting HARQ-ACK/NACK corresponding to a first SPS PDSCH based on a first target feedback resource corresponding to a third specified SPS PDSCH. The third specified SPS PDSCH is determined from the first SPS PDSCH and the second SPS PDSCH based on third information. A HARQ feedback mode corresponding to the first SPS PDSCH is feedback of HARQ-ACK/NACK, and a HARQ feedback mode corre-sponding to the second SPS PDSCH is feedback of HARQ-NACK only.

(5) Reporting HARQ-ACK/NACK corresponding to the first SPS PDSCH and HARQ-NACK corresponding to the second SPS PDSCH based on a first target PUCCH resource corresponding to the first SPS PDSCH. A HARQ feedback mode corresponding to the first SPS PDSCH is feedback of HARQ-ACK/NACK, and a HARQ feedback mode corre-sponding to the second SPS PDSCH is feedback of HARQ-NACK only.

For example, even for an SPS group-common PDSCH (that is, the second SPS PDSCH) configured with reporting NACK only, the terminal still reports HARQ-ACK/NACK. In other words, the terminal reports both HARQ-ACK/NACK corresponding to an SPS group-common PDSCH (that is, the first SPS PDSCH) configured with reporting ACK/NACK and HARQ-ACK/NACK corresponding to an SPS group-common PDSCH configured with reporting NACK only.

It should be noted that in the forgoing example 2, the first SPS PDSCH can include SPS group-common PDSCH or SPS unicast PDSCH, and the second SPS PDSCH includes SPS group-common PDSCH. In other words, in a case that the first SPS PDSCH can include SPS group-common PDSCH and the second SPS PDSCH includes SPS group-common PDSCH, or that the first SPS PDSCH includes SPS unicast PDSCH and the second SPS PDSCH includes SPS group-common PDSCH, the terminal can use the transmis-sion methods given in example 2 to report multiple pieces of feedback information.

Example 3

In a case that the at least one target SPS PDSCH includes a third SPS PDSCH and a fourth SPS PDSCH, and feedback information corresponding to the third SPS PDSCH and feedback information corresponding to the fourth SPS PDSCH need to be reported in one same time unit, the terminal performs the transmission method in the following (1) or (2). The third SPS PDSCH is an SPS group-common PDSCH, and the fourth SPS PDSCH is an SPS unicast PDSCH.

(1) Reporting feedback information corresponding to a fourth specified SPS PDSCH based on a first target PUCCH resource corresponding to the fourth specified SPS PDSCH, where the fourth specified SPS PDSCH is determined from the third SPS PDSCH and the fourth SPS PDSCH based on fourth information.

For example, the terminal can determine based on the fourth information whether to report only HARQ-ACK corresponding to the SPS group-common PDSCH (that is, the third SPS PDSCH) or report only HARQ-ACK corre-sponding to the SPS unicast PDSCH (that is, the fourth SPS PDSCH). For the fourth information and the process of determining the fourth specified SPS PDSCH based on the fourth information, reference may be made to the description of the first information. To avoid repetition, details not be repeated herein again.

(2) Multiplexing and then reporting the feedback infor-mation corresponding to the third SPS PDSCH and the feedback information corresponding to the fourth SPS PDSCH.

In contrast to (1), where the terminal reports one piece of feedback information only, in this implementation, feedback information multiplexing is used to report the feedback information corresponding to the third SPS PDSCH and the feedback information corresponding to the fourth SPS PDSCH, ensuring the integrity of the feedback information.

In this embodiment, the feedback process of multiplexing and then reporting the feedback information corresponding to the third SPS PDSCH and the feedback information corresponding to the fourth SPS PDSCH can include: in a case that the third SPS PDSCH and the fourth SPS PDSCH correspond to different PUCCH configurations (PUCCH-config), the terminal performs at least one of the following (2a) to (2e). In the following (2a) to (2e), the fourth PUCCH resource is used for reporting HARQ-ACK corresponding to the SPS unicast PDSCH, and the fifth PUCCH resource is used for reporting HARQ-ACK corresponding to the SPS group-common PDSCH, where the target HARQ-ACK is obtained by multiplexing the HARQ-ACK corresponding to the third SPS PDSCH and the HARQ-ACK corresponding to the fourth SPS PDSCH.

(2a) In a case that at least one fourth PUCCH resource is configured in a PUCCH configuration corresponding to the fourth SPS PDSCH, selecting a second target PUCCH resource from the at least one fourth PUCCH resource based on the number of bits of the target HARQ-ACK, and reporting the target HARQ-ACK based on the second target PUCCH resource.

Specifically, in a case that PUCCH-config corresponding to an SPS unicast PDSCH includes one or more PUCCH resources used for reporting HARQ-ACK for the SPS unicast PDSCH, for example, SPS-PUCCH-AN-List-r16 is configured, the terminal can select, based on the number of bits of the multiplexed target HARQ-ACK, one PUCCH resource from PUCCH resources configured in SPS-PUCCH-AN-List-r16 corresponding to the SPS unicast PDSCH, for multiplexing.

(2b) In a case that no fourth PUCCH resource is configured in a PUCCH configuration corresponding to the fourth SPS PDSCH but a fifth PUCCH resource is configured in a PUCCH configuration corresponding to the third SPS PDSCH, selecting a second target PUCCH resource from the at least one fifth PUCCH resource corresponding to the third SPS PDSCH based on the number of bits of the target HARQ-ACK, and reporting the target HARQ-ACK based on the second target PUCCH resource.

For example, in a case that PUCCH-config corresponding to the SPS unicast PDSCH does not include one or more PUCCH resources used for reporting HARQ-ACK for SPS unicast PDSCH, for example, in a case that SPS-PUCCH-AN-List-r16 is not configured, but PUCCH-config corresponding to the SPS group-common PDSCH includes one or more PUCCH resources used for reporting HARQ-ACK for the SPS unicast PDSCH, for example, in a case that SPS-PUCCH-AN-List-r16 is configured, the terminal can select, based on the number of bits of the multiplexed target HARQ-ACK, one PUCCH resource from PUCCH resources configured in SPS-PUCCH-AN-List-r16 corresponding to the SPS group-common PDSCH, for multiplexing.

(2c) In a case that no fifth PUCCH resource is configured in a PUCCH configuration corresponding to the third SPS PDSCH and no fourth PUCCH resource is configured in a PUCCH configuration corresponding to the fourth SPS PDSCH, reporting HARQ-ACK corresponding to the third SPS PDSCH based on a first target PUCCH resource corresponding to the third SPS PDSCH, or reporting HARQ-ACK corresponding to the fourth SPS PDSCH based on a first target PUCCH resource corresponding to the fourth SPS PDSCH.

For example, in a case that neither PUCCH-config corresponding to the SPS unicast PDSCH nor PUCCH-config corresponding to the group-common PDSCH is configured with SPS-PUCCH-AN-List-r16, the terminal can discard HARQ-ACK corresponding to the SPS group-common PDSCH or HARQ-ACK corresponding to the SPS unicast PDSCH. In other words, the terminal reports only HARQ-ACK corresponding to the SPS unicast PDSCH or HARQ-ACK corresponding to the SPS group-common PDSCH.

(2d) In a case that no fifth PUCCH resource is configured in a PUCCH configuration corresponding to the third SPS PDSCH and no fourth PUCCH resource is configured in a PUCCH configuration corresponding to the fourth SPS PDSCH, reporting target HARQ-ACK based on a first target PUCCH resource corresponding to the third SPS PDSCH, or reporting target HARQ-ACK based on a PUCCH resource corresponding to the fourth SPS PDSCH.

For example, in a case that neither PUCCH-config corresponding to the SPS unicast PDSCH nor PUCCH-config corresponding to the group-common PDSCH is configured with SPS-PUCCH-AN-List-r16, HARQ-ACK corresponding to the SPS group-common PDSCH and HARQ-ACK corresponding to the SPS unicast PDSCH are multiplexed on a PUCCH resource corresponding to the SPS group-common PDSCH or multiplexed on a PUCCH resource corresponding to the SPS unicast PDSCH for reporting.

(2e) In a case that PUCCH configuration corresponding to the third SPS PDSCH includes at least one fifth PUCCH resource, selecting a second target PUCCH resource from the at least one fifth PUCCH resource based on the number of bits of the target HARQ-ACK, and reporting the target HARQ-ACK based on the second target PUCCH resource.

For example, in a case that PUCCH-config corresponding to the SPS group-common PDSCH includes one or more PUCCH resources used for reporting HARQ-ACK for SPS group-common PDSCH, for example, in a case that SPS-PUCCH-AN-List-r16 is configured, the terminal can select, based on the number of bits of the multiplexed target HARQ-ACK, one PUCCH resource from PUCCH resources configured in SPS-PUCCH-AN-List-r16 corresponding to the SPS group-common PDSCH to report the target HARQ-ACK.

(2f) In a case that no fifth PUCCH resource is configured in a PUCCH configuration corresponding to the third SPS PDSCH but a fourth PUCCH resource is configured in a PUCCH configuration corresponding to the fourth SPS PDSCH, selecting a second target PUCCH resource from the at least one fourth PUCCH resource corresponding to the fourth SPS PDSCH based on the number of bits of the target HARQ-ACK, and reporting the target HARQ-ACK based on the second target PUCCH resource.

For example, in a case that PUCCH-config corresponding to the group-common PDSCH does not include one or more PUCCH resources used for reporting HARQ-ACK for SPS group-common PDSCH, that is, in a case that SPS-PUCCH-AN-List-r16 is not configured but PUCCH-config corresponding to the SPS unicast PDSCH includes one or more PUCCH resources used for reporting HARQ-ACK for the SPS unicast PDSCH, for example, in a case that SPS-PUCCH-AN-List-r16 is configured, the terminal can select, based on the number of bits of the multiplexed target HARQ-ACK, one PUCCH resource from PUCCH resources configured in SPS-PUCCH-AN-Li st-r16 corresponding to the SPS group-common PDSCH to report the target HARQ-ACK.

Optionally, in the foregoing (2a) to (2e), the feedback information corresponding to the third SPS PDSCH and the feedback information corresponding to the fourth SPS PDSCH have a same priority. Furthermore, a HARQ feedback mode corresponding to the third SPS PDSCH is feedback of HARQ-ACK/NACK.

In a possible implementation, in a case that the terminal obtains the target HARQ-ACK by multiplexing the HARQ-ACK corresponding to the third SPS PDSCH and the HARQ-ACK corresponding to the fourth SPS PDSCH, the number of bits of the target HARQ-ACK is processed (for example, compressed or bundled) into a predetermined number of bits. The predetermined number of bits can be 1 bit or 2 bits, without limitation.

In this embodiment, for scenarios where feedback information corresponding to multiple SPS PDSCHs needs to be transmitted in one same time unit, the terminal can determine, based on HARQ feedback modes of the SPS PDSCHs and/or types of the SPS PDSCHs (such as SPS group-common PDSCHs or SPS unicast PDSCHs), SPS PDSCHs for which feedback information needs to be transmitted and PUCCH resources to be used, thereby ensuring the normal transmission of feedback information and improving the performance of the wireless communication system.

FIG. 4 is a schematic flowchart of a method 400 for determining PUCCH resource according to an example embodiment of this application. The method may be performed by a terminal, but is not limited to that and can be specifically executed by hardware and/or software installed on the terminal. In this embodiment, the method 400 may include at least the following steps.

S410. In a case that multiple SPS PDSCHs are configured or activated on the terminal and feedback information corresponding to at least one target SPS PDSCH in the multiple SPS PDSCHs needs to be reported in one same time unit, determine a first target PUCCH resource based on a HARQ feedback mode corresponding to the target SPS PDSCH.

It can be understood that for an implementation process of S410, reference may be made to the relevant descriptions in the previous method embodiment 200 or 300. To avoid repetition, details are not described herein again.

S420. In a case that feedback information corresponding to the multiple target SPS PDSCHs needs to be reported in one same time unit, construct a first target codebook according to a predetermined manner. The first target codebook is determined based on feedback information corresponding to the multiple target SPS PDSCHs. The predetermined manner includes the following method 1 or/and method 2.

Method 1: Constructing the first target codebook based on a predetermined order, where the predetermined order includes at least one of the following: magnitudes of configuration indexes corresponding to the target SPS PDSCHs, reception timing of the target SPS PDSCHs, and magnitudes of indexes of serving cells where the target SPS PDSCHs are locate.

Specifically, the terminal can construct the first HARQ-ACK codebook in the following ways: in ascending order of the configuration indexes corresponding to the SPS PDSCHs, in the order of reception time of the SPS PDSCHs from early to late, or in ascending order of indexes of serving cells where the PDSCHs are located.

Method 2: In a case that the multiple target SPS PDSCHs include both SPS group-common PDSCH and SPS unicast PDSCH, constructing a first HARQ-ACK codebook corresponding to the SPS group-common PDSCH and a second HARQ-ACK codebook corresponding to the SPS unicast PDSCH, and concatenating the first HARQ-ACK codebook and the second HARQ-ACK codebook to obtain the first target codebook.

Specifically, the terminal can construct the HARQ-ACK codebooks corresponding to the SPS group-common PDSCH and the SPS unicast PDSCH respectively and concatenate the two codebooks. During concatenating, the HARQ-ACK codebook of the SPS group-common PDSCH can be placed before or after the HARQ-ACK codebook of the SPS unicast PDSCH, without limitation.

In addition, based on the codebook construction methods provided in method 1 and/or method 2, in a case that the terminal needs to report the first target codebook and the second target codebook in one same time unit, the second target codebook is concatenated before the first target codebook. The second target codebook is a HARQ-ACK codebook (CB) corresponding to a dynamically scheduled (DG) PDSCH.

Specifically, in a case that HARQ-ACK corresponding to a dynamically scheduled PDSCH needs to be reported in one same time unit as HARQ-ACK corresponding to one or more SPS group-common PDSCHs or one or more SPS unicast PDSCHs, the terminal can first construct the first HARQ-ACK codebook corresponding to the SPS PDSCH according to the foregoing method 1 and/or method 2, and concatenate this first HARQ-ACK codebook after the second HARQ-ACK codebook corresponding to the dynamically scheduled PDSCH.

For better understanding, the following examples further illustrate the concatenating of the first HARQ-ACK codebook and the second HARQ-ACK codebook mentioned above.

(1) In a case that the second HARQ-ACK codebook includes unicast DG HARQ-ACK and the first HARQ-ACK codebook includes SPS group-common HARQ-ACK (that is, HARQ-ACK corresponding to the SPS group-common PDSCH), or in a case that the second HARQ-ACK codebook includes group-common DG HARQ-ACK and the first HARQ-ACK codebook includes SPS group-common HARQ-ACK, the first HARQ-ACK codebook can be concatenated after the second HARQ-ACK codebook.

(2) In a case that the second HARQ-ACK codebook includes unicast DG HARQ-ACK and the first HARQ-ACK codebook includes SPS group-common HARQ-ACK+SPS unicast HARQ-ACK, or in a case that the second HARQ-ACK codebook includes group-common DG HARQ-ACK and the first HARQ-ACK codebook includes SPS group-common HARQ-ACK+SPS unicast HARQ-ACK, the first HARQ-ACK codebook can be constructed according to the method 1 or method 2, and the first HARQ-ACK codebook can be concatenated after the second HARQ-ACK codebook.

(3) In a situation where the second HARQ-ACK codebook includes unicast DG HARQ-ACK+group-common DG HARQ-ACK, the first HARQ-ACK codebook includes SPS group-common HARQ-ACK+SPS unicast HARQ-ACK, in a case that the first HARQ-ACK codebook is constructed according to method 1, the first HARQ-ACK codebook and the second HARQ-ACK codebook can be concatenated according to the following manner (3a) or (3b).

(3a) unicast DG HARQ-ACK+group-common DG HARQ-ACK+first HARQ-ACK codebook;

(3b) group-common DG HARQ-ACK+unicast DG HARQ-ACK+first HARQ-ACK codebook;

in a case that the first HARQ-ACK codebook is constructed according to method 2 or that the first HARQ-ACK codebook includes separate codebooks for SPS unicast HARQ-ACK and SPS group-common HARQ-ACK, the first HARQ-ACK codebook and the second HARQ-ACK codebook can be concatenated according to the following (3c) or (3d) or (3e) or (3f):

(3c) unicast DG HARQ-ACK+group-common DG HARQ-ACK+SPS unicast HARQ-ACK+SPS group-common HARQ-ACK;

(3d) unicast DG HARQ-ACK+SPS unicast HARQ-ACK+group-common DG HARQ-ACK+SPS group-common HARQ-ACK;

(3e) group-common DG HARQ-ACK+unicast DG HARQ-ACK+SPS group-common HARQ-ACK+SPS unicast HARQ-ACK;

(3f) group-common DG HARQ-ACK+SPS group-common HARQ-ACK+unicast DG HARQ-ACK+SPS unicast HARQ-ACK;

It should be noted that in the above 3(a) to 3(f), the group-common DG HARQ-ACK mentioned is feedback information corresponding to the dynamically scheduled group-common PDSCH, the unicast DG HARQ-ACK is feedback information corresponding to the dynamically scheduled unicast PDSCH, the SPS group-common HARQ-ACK is feedback information corresponding to the SPS group-common PDSCH, and the SPS unicast HARQ-ACK is feedback information corresponding to the SPS unicast PDSCH.

In this embodiment, for a scenario where the HARQ-ACK corresponding to the SPS group-common PDSCH and the HARQ-ACK corresponding to the SPS unicast PDSCH need to be reported in one time unit, the terminal can determine a codebook according to a predetermined method, thus ensuring effective transmission of feedback information and improving wireless communication performance.

It should be noted that the method 200 to 400 for determining PUCCH resource according to the embodiment of this application can be performed by an apparatus for determining PUCCH resource or by a control module for performing the method for determining PUCCH resource in the apparatus for determining PUCCH resource. In this embodiment of this application, the method for determining PUCCH resource being performed by the apparatus for determining PUCCH resource is used as an example to describe the apparatus for determining PUCCH resource.

Figure 5A:
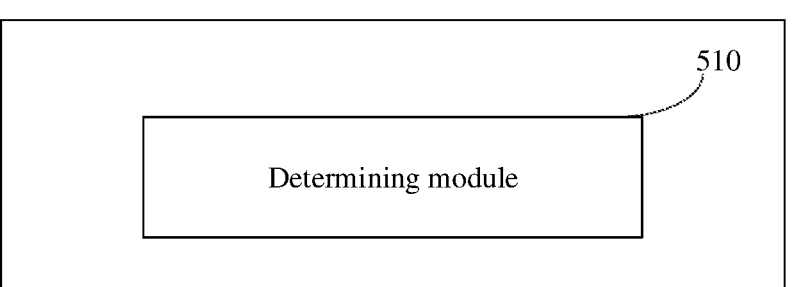
FIG. 5a is a schematic block diagram of a structure of an apparatus for determining PUCCH resource according to an example embodiment of this application.

FIG. 5a is a schematic diagram of a block structure of an apparatus 500 for determining PUCCH resource according to an example embodiment of this application. The apparatus 500 includes a determining module 510 configured to: in a case that multiple SPS PDSCHs are configured or activated and feedback information corresponding to at least one target SPS PDSCH in the multiple SPS PDSCHs needs to be reported in one same time unit, determine a first target PUCCH resource, where the first target PUCCH resource is used for transmitting the feedback information corresponding to the target SPS PDSCH.

Optionally, the determining module 510 is configured to determine the first target PUCCH resource based on a HARQ feedback mode corresponding to the target SPS PDSCH, where the HARQ feedback mode includes at least one of the following: no feedback of HARQ information, feedback of HARQ-NACK only (only), and feedback of HARQ-ACK/NACK.

Optionally, the apparatus 500 is configured with feedback resources. The feedback resources include at least one of the following: a first resource, which is a PUCCH resource for transmitting feedback information corresponding to first SPS group-common PDSCH, where the HARQ feedback mode corresponding to the first SPS group-common PDSCH is feedback of HARQ-ACK/NACK; a second resource, which is a PUCCH resource for transmitting feedback information corresponding to second SPS group-common PDSCH, where the HARQ feedback mode corresponding to the second SPS group-common PDSCH is feedback of HARQ-NACK only; and a third resource, which is a PUCCH resource for transmitting feedback information corresponding to SPS unicast PDSCH.

Optionally, the determining module 510 is configured to perform at least one of the following: in a case that the HARQ feedback mode corresponding to the target SPS PDSCH is feedback of HARQ-ACK/NACK and the target SPS PDSCH is an SPS group-common PDSCH, determining the first target PUCCH resource based on the number of bits of HARQ-ACK/NACK corresponding to the target SPS PDSCH; in a case that the HARQ feedback mode corresponding to the target SPS PDSCH is feedback of HARQ-NACK only and the target SPS PDSCH is an SPS group-common PDSCH, determining a first PUCCH resource as the first target PUCCH resource, where the first PUCCH resource is a PUCCH resource configured for the target SPS PDSCH; and in a case that the HARQ feedback mode corresponding to the target SPS PDSCH is feedback of HARQ-NACK only and the target SPS PDSCH is an SPS group-common PDSCH, determining a second PUCCH resource as the first target PUCCH resource, where the second PUCCH resource is used for transmitting feedback information for any SPS group-common PDSCH configured with feedback of HARQ-NACK only.

Figure 5B:
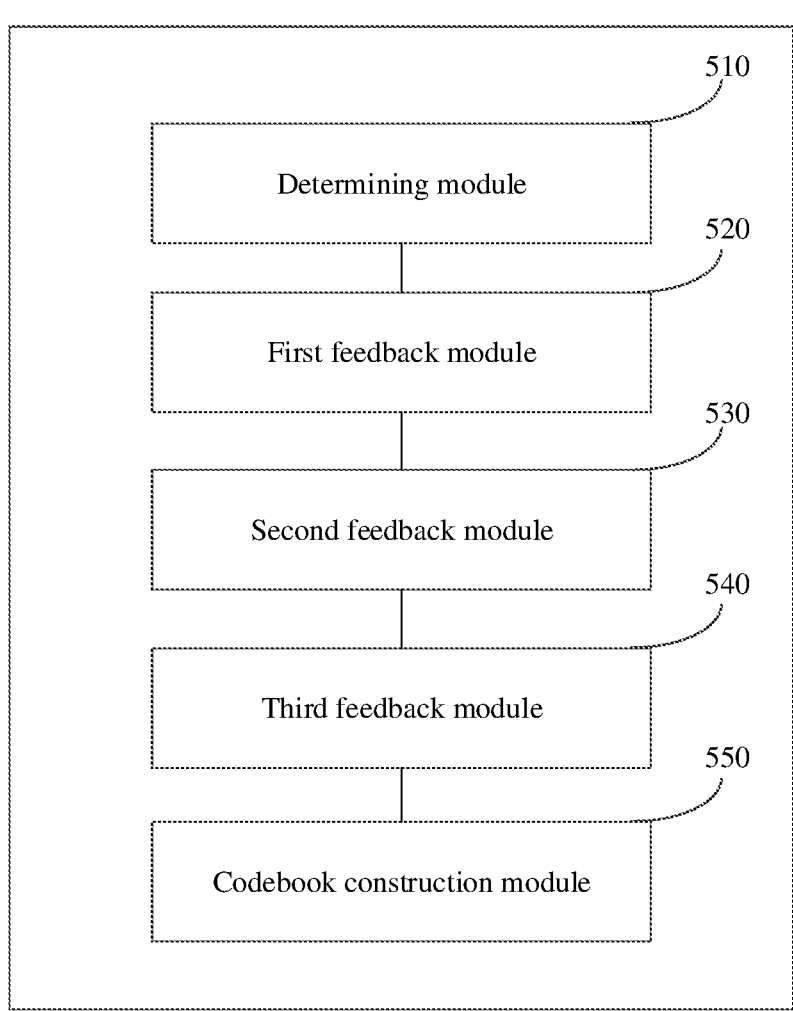
FIG. 5b is a schematic block diagram of a structure of an apparatus for determining PUCCH resource according to another example embodiment of this application.

Optionally, with reference to FIG. 5b, the apparatus 500 further includes a first feedback module 520 configured to: in a case that feedback information corresponding to multiple target SPS PDSCHs needs to be reported in one same time unit and the HARQ feedback mode corresponding to each of the target SPS PDSCHs is feedback of HARQ-NACK only, perform at least one of the following: in a case that any target SPS PDSCH in the multiple target SPS PDSCHs requires NACK feedback, reporting NACK based on the first target PUCCH resource, where the first target PUCCH resource is a PUCCH resource configured for the target SPS PDSCH that requires NACK feedback, or the first target PUCCH resource is used for transmitting feedback information for any SPS group-common PDSCH configured with feedback of HARQ-NACK only; in a case that only one SPS PDSCH in the multiple target SPS PDSCHs requires NACK feedback, reporting NACK based on a first target PUCCH resource corresponding to the SPS PDSCH that requires NACK feedback; and in a case that at least two SPS PDSCHs in the multiple target SPS PDSCHs require NACK feedback, reporting NACK corresponding to a first specified SPS PDSCH based on a first target PUCCH resource corresponding to the first specified SPS PDSCH, where the first specified SPS PDSCH is determined, based on first information, from the at least two SPS PDSCHs that require NACK feedback, or the first specified SPS PDSCH is any one of the at least two target SPS PDSCHs that is determined by the terminal.

Optionally, with reference to FIG. 5b again, the apparatus 500 further includes a second feedback module 530 configured to: in a case that the at least one target SPS PDSCH includes a first SPS PDSCH and a second SPS PDSCH, and feedback information corresponding to the first SPS PDSCH and feedback information corresponding to the second SPS PDSCH need to be reported in one same time unit, perform at least one of the following: reporting HARQ-ACK/NACK corresponding to the first SPS PDSCH based on a first target PUCCH resource corresponding to the first SPS PDSCH; reporting HARQ-NACK corresponding to the second SPS PDSCH based on a first target PUCCH resource corresponding to the second SPS PDSCH; reporting feedback information corresponding to a second specified SPS PDSCH based on a first target feedback resource corresponding to the second specified SPS PDSCH, where the second specified SPS PDSCH is determined from the first SPS PDSCH and the second SPS PDSCH based on second information; in a case that feedback information corresponding to the second SPS PDSCH is not NACK, reporting HARQ-ACK/NACK corresponding to the first SPS PDSCH based on a first target feedback resource corresponding to a third specified SPS PDSCH, where the third specified SPS PDSCH is determined from the first SPS PDSCH and the second SPS PDSCH based on third information; and reporting HARQ-ACK/NACK corresponding to the first SPS PDSCH and HARQ-NACK corresponding to the second SPS PDSCH based on a first target PUCCH resource corresponding to the first SPS PDSCH; where a HARQ feedback mode corresponding to the first SPS PDSCH is feedback of HARQ-ACK/NACK, and a HARQ feedback mode corresponding to the second SPS PDSCH is feedback of HARQ-NACK only.

Optionally, the first SPS PDSCH includes SPS group-common PDSCH or SPS unicast PDSCH, and the second SPS PDSCH includes SPS group-common PDSCH.

Optionally, with reference to FIG. 5b again, the apparatus 500 includes a third feedback module 540 configured to: in a case that the at least one target SPS PDSCH includes a third SPS PDSCH and a fourth SPS PDSCH, and feedback information corresponding to the third SPS PDSCH and feedback information corresponding to the fourth SPS PDSCH need to be reported in one same time unit, perform any one of the following: reporting feedback information corresponding to a fourth specified SPS PDSCH based on a first target PUCCH resource corresponding to the fourth specified SPS PDSCH, where the fourth specified SPS PDSCH is determined from the third SPS PDSCH and the fourth SPS PDSCH based on fourth information; and multiplexing and then reporting the feedback information corresponding to the third SPS PDSCH and the feedback information corresponding to the fourth SPS PDSCH; where the third SPS PDSCH is an SPS group-common PDSCH, and the fourth SPS PDSCH is an SPS unicast PDSCH.

Optionally, the first information, the second information, the third information, and the fourth information each include at least one of the following: priority information of SPS PDSCH, priority information of feedback information for SPS PDSCH, service priority information corresponding to SPS PDSCH, configuration index information corresponding to SPS PDSCH, index information of service cell where SPS PDSCH is located, and reception time information of SPS PDSCH.

Optionally, in a case that the third SPS PDSCH and the fourth SPS PDSCH correspond to different PUCCH configurations (PUCCH-config), the third feedback module is configured to perform at least one of the following: in a case that at least one fourth PUCCH resource is configured in a PUCCH configuration corresponding to the fourth SPS PDSCH, selecting a second target PUCCH resource from the at least one fourth PUCCH resource based on the number of bits of target HARQ-ACK, and reporting the target HARQ-ACK based on the second target PUCCH resource; in a case that no fourth PUCCH resource is configured in a PUCCH configuration corresponding to the fourth SPS PDSCH but a fifth PUCCH resource is configured in a PUCCH configuration corresponding to the third SPS PDSCH, selecting a second target PUCCH resource from the at least one fifth PUCCH resource corresponding to the third SPS PDSCH based on the number of bits of target HARQ-ACK, and reporting the target HARQ-ACK based on the second target PUCCH resource; in a case that no fifth PUCCH resource is configured in a PUCCH configuration corresponding to the third SPS PDSCH and no fourth PUCCH resource is configured in a PUCCH configuration corresponding to the fourth SPS PDSCH, reporting HARQ-ACK corresponding to the third SPS PDSCH based on a first target PUCCH resource corresponding to the third SPS PDSCH, or reporting HARQ-ACK corresponding to the fourth SPS PDSCH based on a first target PUCCH resource corresponding to the fourth SPS PDSCH; in a case that no fifth PUCCH resource is configured in a PUCCH configuration corresponding to the third SPS PDSCH and no fourth PUCCH resource is configured in a PUCCH configuration corresponding to the fourth SPS PDSCH, reporting target HARQ-ACK based on a first target PUCCH resource corresponding to the third SPS PDSCH, or reporting target HARQ-ACK based on a PUCCH resource corresponding to the fourth SPS PDSCH; in a case that PUCCH configuration corresponding to the third SPS PDSCH includes at least one fifth PUCCH resource, selecting a second target PUCCH resource from the at least one fifth PUCCH resource based on the number of bits of target HARQ-ACK, and reporting the target HARQ-ACK based on the second target PUCCH resource; and in a case that no fifth PUCCH resource is configured in a PUCCH configuration corresponding to the third SPS PDSCH but a fourth PUCCH resource is configured in a PUCCH configuration corresponding to the fourth SPS PDSCH, selecting a second target PUCCH resource from the at least one fourth PUCCH resource corresponding to the fourth SPS PDSCH based on the number of bits of target HARQ-ACK, and reporting the target HARQ-ACK based on the second target PUCCH resource; where the fourth PUCCH resource is used for reporting HARQ-ACK corresponding to SPS unicast PDSCH, the fifth PUCCH resource is used for reporting HARQ-ACK corresponding to SPS group-common PDSCH, and the target HARQ-ACK is obtained by multiplexing the HARQ-ACK corresponding to the third SPS PDSCH and the HARQ-ACK corresponding to the fourth SPS PDSCH.

Optionally, the feedback information corresponding to the third SPS PDSCH and the feedback information corresponding to the fourth SPS PDSCH have a same priority.

Optionally, in a case that the target HARQ-ACK is obtained by multiplexing the HARQ-ACK corresponding to the third SPS PDSCH and the HARQ-ACK corresponding to the fourth SPS PDSCH, the number of bits of the target HARQ-ACK is processed into a predetermined number of bits.

Optionally, a HARQ feedback mode corresponding to the third SPS PDSCH is feedback of HARQ-ACK/NACK.

Optionally, the apparatus 500 further includes a codebook construction module 550 configured to: in a case that feedback information corresponding to the multiple target SPS PDSCHs needs to be reported in one same time unit, construct a first target codebook in any of the following ways, where the first target codebook is determined based on feedback information corresponding to the multiple target SPS PDSCHs: constructing the first target codebook based on a predetermined order, where the predetermined order includes at least one of the following: magnitudes of configuration indexes corresponding to the target SPS PDSCHs, reception timing of the target SPS PDSCHs, and magnitudes of indexes of serving cells where the target SPS PDSCHs are located; and in a case that the multiple target SPS PDSCHs include both SPS group-common PDSCH and SPS unicast PDSCH, construct a first HARQ-ACK codebook corresponding to the SPS group-common PDSCH and a second HARQ-ACK codebook corresponding to the SPS unicast PDSCH, and concatenate the first HARQ-ACK codebook and the second HARQ-ACK codebook to obtain the first target codebook.

Optionally, the codebook construction module 550 is further configured to: in a case that the first target codebook and the second target codebook need to be reported in one same time unit, concatenate the second target codebook before the first target codebook, where the second target codebook is a HARQ-ACK codebook corresponding to dynamically scheduled PD SCH.

The apparatus 500 for determining PUCCH resource in embodiments of this application may be an apparatus or electronic device having an operating system, or may be a component, an integrated circuit, or a chip in a terminal. The apparatus or electronic device may be a mobile terminal or a non-mobile terminal. The operating system may be an android operating system, iOS operating system, or other possible operating system. This is not specifically limited in the embodiments of this application. For example, the mobile terminal may include but is not limited to the types of the terminal 11 listed above, and the non-mobile terminal may be a server, a network attached storage (NAS), a personal computer (PC), a television (TV), a teller machine, a self-service machine, or the like, which is not specifically limited in this embodiment of this application.

The apparatus for determining PUCCH resource provided in the embodiments of this application can implement the processes implemented by the method embodiments in FIG. 2 to FIG. 4. To avoid repetition, details are not described herein again.

Figure 6:
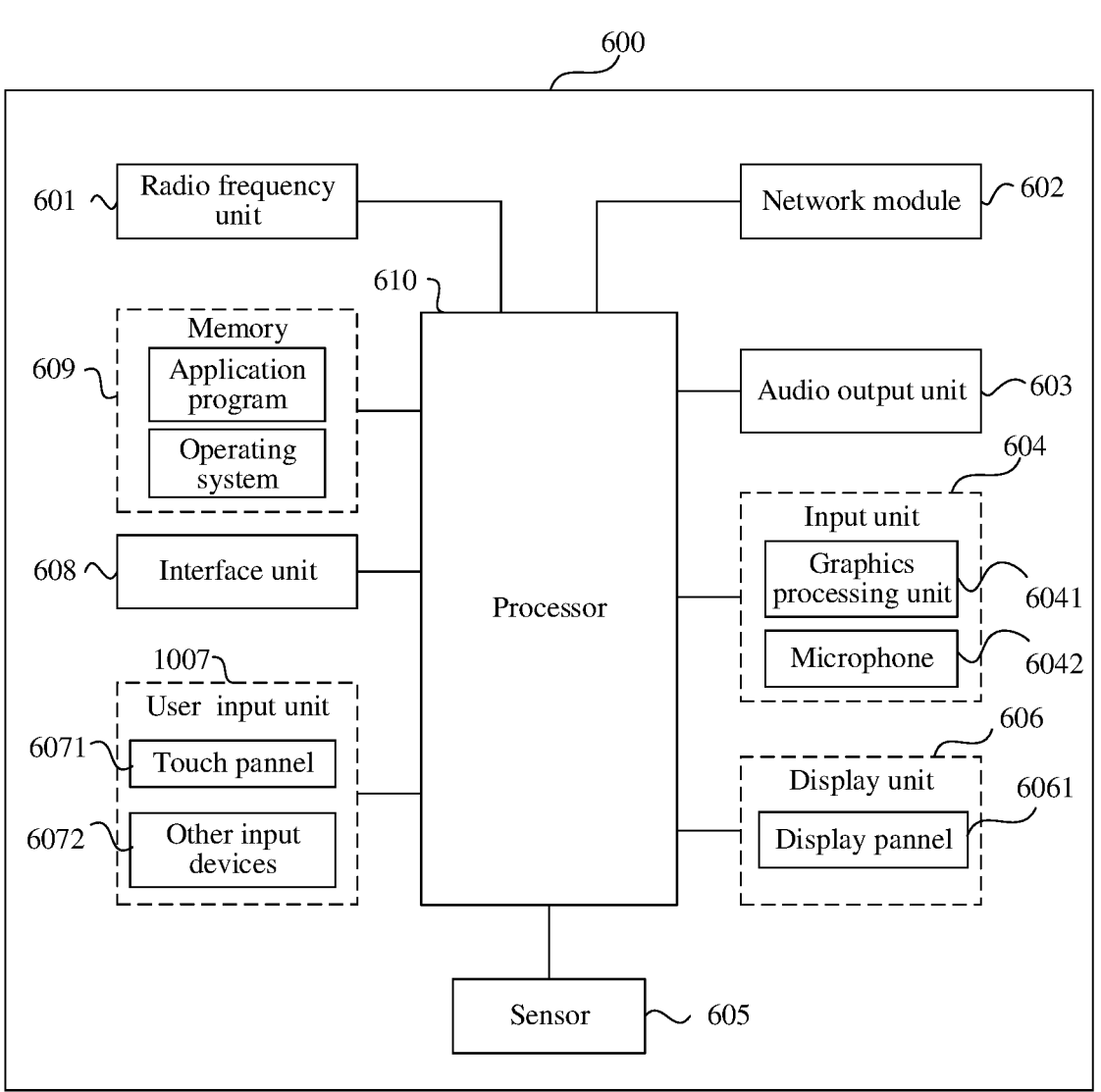
FIG. 6 is a schematic block diagram of a structure of a terminal according to an example embodiment of this application.

An embodiment of this application further provides a terminal including a processor and a communications interface, where the communications interface is coupled to the processor, and the processor is configured to run a program or instructions to implement the method in the method embodiments 200 to 400. It should be noted that the terminal embodiment is corresponding to the method embodiment on the terminal side. All implementation processes and implementations of the foregoing method embodiment are applicable to the terminal embodiment, with the same technical effect achieved. Specifically, FIG. 6 is a schematic diagram of a hardware structure of a terminal implementing an embodiment of this application.

The terminal 600 includes but is not limited to at least some of components such as a radio frequency unit 601, a network module 602, an audio output unit 603, an input unit 604, a sensor 605, a display unit 606, a user input unit 607, an interface unit 608, a memory 609, and a processor 610.

It can be understood by those skilled in the art that the terminal 600 may further include a power supply (for example, a battery) supplying power to the components. The power supply may be logically connected to the processor 610 via a power management system, so that functions such as charge management, discharge management, and power consumption management are implemented by using the power management system. The structure of the terminal shown in FIG. 6 does not constitute any limitation on the terminal, and the terminal may include more or fewer components than shown in the figure, or combine some of the components, or have different arrangements of the components. Details are not described herein.

It should be understood that in this embodiment of this application, the input unit 604 may include a graphics processing unit (GPU) 6041 and a microphone 6042. The graphics processing unit 6041 processes image data of a static picture or a video that is obtained by an image capture apparatus (for example, a camera) in a video capture mode or an image capture mode. The display unit 606 may include a display panel 6061. The display panel 6061 may be configured in a form of a liquid crystal display, an organic light-emitting diode display, or the like. The user input unit 607 includes a touch panel 6071 and other input devices 6072. The touch panel 6071 is also referred to as a touch-screen. The touch panel 6071 may include two parts: a touch detection apparatus and a touch controller. The other input devices 6072 may include but are not limited to a physical keyboard, a functional button (such as a volume control button or a power on/off button), a trackball, a mouse, and a joystick. Details are not described herein.

In this embodiment of this application, the radio frequency unit 601 transmits downlink data received from a network-side device to the processor 610 for processing, and in addition, transmits uplink data to the network-side device. Generally, the radio frequency unit 601 includes but is not limited to an antenna, at least one amplifier, a transceiver, a coupler, a low noise amplifier, a duplexer, and the like.

The memory 609 may be configured to store software programs or instructions and various data. The memory 609 may include a program or instruction storage area and a data storage area. The program or instruction storage area may store an operating system, an application program or instruction required by at least one function (for example, a sound playback function or an image playback function), and the like. In addition, the memory 609 may include high-speed random access memory and may also include non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, a flash memory device, or other non-volatile solid-state storage devices.

The processor 610 may include one or more processing units. Optionally, an application processor and a modem processor may be integrated in the processor 610. The application processor primarily processes an operating system, user interfaces, application programs or instructions, and the like. The modem processor primarily processes radio communication, for example, being a baseband processor. It can be understood that the modem processor may alternatively be not integrated in the processor 610.

The processor 610 is configured to: in a case that multiple SPS PDSCHs are configured or activated and feedback information corresponding to at least one target SPS PDSCH in the multiple SPS PDSCHs needs to be reported in one same time unit, determine a first target PUCCH resource, where the first target PUCCH resource is used for transmitting the feedback information corresponding to the target SPS PDSCH.

Optionally, the processor 610 is configured to determine the first target PUCCH resource based on a HARQ feedback mode corresponding to the target SPS PDSCH, where the HARQ feedback mode includes at least one of the following: no feedback of HARQ information, feedback of HARQ-NACK only (only), and feedback of HARQ-ACK/NACK.

Optionally, the apparatus is configured with feedback resources. The feedback resources include at least one of the following: a first resource, which is a PUCCH resource for transmitting feedback information corresponding to first SPS group-common PDSCH, where the HARQ feedback mode corresponding to the first SPS group-common PDSCH is feedback of HARQ-ACK/NACK; a second resource, which is a PUCCH resource for transmitting feedback information corresponding to second SPS group-common PDSCH, where the HARQ feedback mode corresponding to the second SPS group-common PDSCH is feedback of HARQ-NACK only; and a third resource, which is a PUCCH resource for transmitting feedback information corresponding to SPS unicast PDSCH.

Optionally, the processor 610 is further configured to perform at least one of the following: in a case that the HARQ feedback mode corresponding to the target SPS PDSCH is feedback of HARQ-ACK/NACK and the target SPS PDSCH is an SPS group-common PDSCH, determining the first target PUCCH resource based on the number of bits of HARQ-ACK/NACK corresponding to the target SPS PDSCH; in a case that the HARQ feedback mode corresponding to the target SPS PDSCH is feedback of HARQ-NACK only and the target SPS PDSCH is an SPS group-common PDSCH, determining a first PUCCH resource as the first target PUCCH resource, where the first PUCCH resource is a PUCCH resource configured for the target SPS PDSCH; and in a case that the HARQ feedback mode corresponding to the target SPS PDSCH is feedback of HARQ-NACK only and the target SPS PDSCH is an SPS group-common PDSCH, determining a second PUCCH resource as the first target PUCCH resource, where the second PUCCH resource is used for transmitting feedback information for any SPS group-common PDSCH configured with feedback of HARQ-NACK only.

Optionally, the processor 610 is further configured to: in a case that feedback information corresponding to multiple target SPS PDSCHs needs to be reported in one same time unit and the HARQ feedback mode corresponding to each of the target SPS PDSCHs is feedback of HARQ-NACK only, perform any one of the following: in a case that any target SPS PDSCH in the multiple target SPS PDSCHs requires NACK feedback, reporting NACK based on the first target PUCCH resource, where the first target PUCCH resource is a PUCCH resource configured for the target SPS PDSCH that requires NACK feedback, or the first target PUCCH resource is used for transmitting feedback information for any SPS group-common PDSCH configured with feedback of HARQ-NACK only; in a case that only one SPS PDSCH in the multiple target SPS PDSCHs requires NACK feedback, reporting NACK based on a first target PUCCH resource corresponding to the SPS PDSCH that requires NACK feedback; and in a case that at least two SPS PDSCHs in the multiple target SPS PDSCHs require NACK feedback, reporting NACK corresponding to a first specified SPS PDSCH based on a first target PUCCH resource corresponding to the first specified SPS PDSCH, where the first specified SPS PDSCH is determined, based on first information, from the at least two SPS PDSCHs that require NACK feedback, or the first specified SPS PDSCH is any one of the at least two target SPS PDSCHs that is determined by the terminal.

Optionally, the processor 610 is further configured to: in a case that the at least one target SPS PDSCH includes a first SPS PDSCH and a second SPS PDSCH, and feedback information corresponding to the first SPS PDSCH and feedback information corresponding to the second SPS PDSCH need to be reported in one same time unit, perform at least one of the following: reporting HARQ-ACK/NACK corresponding to the first SPS PDSCH based on a first target PUCCH resource corresponding to the first SPS PDSCH; reporting HARQ-NACK corresponding to the second SPS PDSCH based on a first target PUCCH resource corresponding to the second SPS PDSCH; reporting feedback information corresponding to a second specified SPS PDSCH based on a first target feedback resource corresponding to the second specified SPS PDSCH, where the second specified SPS PDSCH is determined from the first SPS PDSCH and the second SPS PDSCH based on second information; in a case that feedback information corresponding to the second SPS PDSCH is not NACK, reporting HARQ-ACK/NACK corresponding to the first SPS PDSCH based on a first target feedback resource corresponding to a third specified SPS PDSCH, where the third specified SPS PDSCH is determined from the first SPS PDSCH and the second SPS PDSCH based on third information; and reporting HARQ-ACK/NACK corresponding to the first SPS PDSCH and HARQ-NACK corresponding to the second SPS PDSCH based on a first target PUCCH resource corresponding to the first SPS PDSCH; where a HARQ feedback mode corresponding to the first SPS PDSCH is feedback of HARQ- ACK/NACK, and a HARQ feedback mode corresponding to the second SPS PDSCH is feedback of HARQ-NACK only.

Optionally, the first SPS PDSCH includes SPS group-common PDSCH or SPS unicast PDSCH, and the second SPS PDSCH includes SPS group-common PDSCH.

Optionally, the processor 610 is further configured to: in a case that the at least one target SPS PDSCH includes a third SPS PDSCH and a fourth SPS PDSCH, and feedback information corresponding to the third SPS PDSCH and feedback information corresponding to the fourth SPS PDSCH need to be reported in one same time unit, perform any one of the following: reporting feedback information corresponding to a fourth specified SPS PDSCH based on a first target PUCCH resource corresponding to the fourth specified SPS PDSCH, where the fourth specified SPS PDSCH is determined from the third SPS PDSCH and the fourth SPS PDSCH based on fourth information; and multiplexing and then reporting the feedback information corresponding to the third SPS PDSCH and the feedback information corresponding to the fourth SPS PDSCH; where the third SPS PDSCH is an SPS group-common PDSCH, and the fourth SPS PDSCH is an SPS unicast PDSCH.

Optionally, the first information, the second information, the third information, and the fourth information each include at least one of the following: priority information of SPS PDSCH, priority information of feedback information for SPS PDSCH, service priority information corresponding to SPS PDSCH, configuration index information corresponding to SPS PDSCH, index information of service cell where SPS PDSCH is located, and reception time information of SPS PDSCH.

Optionally, in a case that the third SPS PDSCH and the fourth SPS PDSCH correspond to different PUCCH configurations (PUCCH-config), the third feedback module is configured to perform at least one of the following: in a case that at least one fourth PUCCH resource is configured in a PUCCH configuration corresponding to the fourth SPS PDSCH, selecting a second target PUCCH resource from the at least one fourth PUCCH resource based on the number of bits of target HARQ-ACK, and reporting the target HARQ-ACK based on the second target PUCCH resource; in a case that no fourth PUCCH resource is configured in a PUCCH configuration corresponding to the fourth SPS PDSCH but a fifth PUCCH resource is configured in a PUCCH configuration corresponding to the third SPS PDSCH, selecting a second target PUCCH resource from the at least one fifth PUCCH resource corresponding to the third SPS PDSCH based on the number of bits of target HARQ-ACK, and reporting the target HARQ-ACK based on the second target PUCCH resource; in a case that no fifth PUCCH resource is configured in a PUCCH configuration corresponding to the third SPS PDSCH and no fourth PUCCH resource is configured in a PUCCH configuration corresponding to the fourth SPS PDSCH, reporting HARQ-ACK corresponding to the third SPS PDSCH based on a first target PUCCH resource corresponding to the third SPS PDSCH, or reporting HARQ-ACK corresponding to the fourth SPS PDSCH based on a first target PUCCH resource corresponding to the fourth SPS PDSCH; in a case that no fifth PUCCH resource is configured in a PUCCH configuration corresponding to the third SPS PDSCH and no fourth PUCCH resource is configured in a PUCCH configuration corresponding to the fourth SPS PDSCH, reporting target HARQ-ACK based on a first target PUCCH resource corresponding to the third SPS PDSCH, or reporting target HARQ-ACK based on a PUCCH resource corresponding to the fourth SPS PDSCH; in a case that PUCCH configuration corresponding to the third SPS PDSCH includes at least one fifth PUCCH resource, selecting a second target PUCCH resource from the at least one fifth PUCCH resource based on the number of bits of target HARQ-ACK, and reporting the target HARQ-ACK based on the second target PUCCH resource; and in a case that no fifth PUCCH resource is configured in a PUCCH configuration corresponding to the third SPS PDSCH but a fourth PUCCH resource is configured in a PUCCH configuration corresponding to the fourth SPS PDSCH, selecting a second target PUCCH resource from the at least one fourth PUCCH resource corresponding to the fourth SPS PDSCH based on the number of bits of target HARQ-ACK, and reporting the target HARQ-ACK based on the second target PUCCH resource; where the fourth PUCCH resource is used for reporting HARQ-ACK corresponding to SPS unicast PDSCH, the fifth PUCCH resource is used for reporting HARQ-ACK corresponding to SPS group-common PDSCH, and the target HARQ-ACK is obtained by multiplexing the HARQ-ACK corresponding to the third SPS PDSCH and the HARQ-ACK corresponding to the fourth SPS PDSCH.

Optionally, the feedback information corresponding to the third SPS PDSCH and the feedback information corresponding to the fourth SPS PDSCH have a same priority.

Optionally, in a case that the target HARQ-ACK is obtained by multiplexing the HARQ-ACK corresponding to the third SPS PDSCH and the HARQ-ACK corresponding to the fourth SPS PDSCH, the number of bits of the target HARQ-ACK is processed into a predetermined number of bits.

Optionally, a HARQ feedback mode corresponding to the third SPS PDSCH is feedback of HARQ-ACK/NACK.

Optionally, the processor 610 is further configured to: in a case that feedback information corresponding to the multiple target SPS PDSCHs needs to be reported in one same time unit, construct a first target codebook in any of the following ways, where the first target codebook is determined based on feedback information corresponding to the multiple target SPS PDSCHs: constructing the first target codebook based on a predetermined order, where the predetermined order includes at least one of the following: magnitudes of configuration indexes corresponding to the target SPS PDSCHs, reception timing of the target SPS PDSCHs, and magnitudes of indexes of serving cells where the target SPS PDSCHs are located; and in a case that the multiple target SPS PDSCHs include both SPS group-common PDSCH and SPS unicast PDSCH, construct a first HARQ-ACK codebook corresponding to the SPS group-common PDSCH and a second HARQ-ACK codebook corresponding to the SPS unicast PDSCH, and concatenate the first HARQ-ACK codebook and the second HARQ-ACK codebook to obtain the first target codebook.

Optionally, the processor 610 is further configured to: in a case that the first target codebook and the second target codebook need to be reported in one same time unit, concatenate the second target codebook before the first target codebook, where the second target codebook is a HARQ-ACK codebook corresponding to dynamically scheduled PDSCH.

In the embodiments, before feedback information is reported, a PUCCH resource corresponding to at least one target SPS PDSCH that requires feedback in one same time unit is determined, thereby solving the problem of the terminal being unable to clearly determine a feedback resource for feedback information transmission due to the need to report in one given time unit feedback information corresponding to multiple SPS PDSCHs. This ensures the normal reporting of feedback information and improves the performance of the wireless communication system.

An embodiment of this application further provides a readable storage medium, where the readable storage medium stores a program or instructions, and when the program or instructions are executed by a processor, the processes of the foregoing method embodiments 200 to 400 for determining PUCCH resource are implemented, with the same technical effects achieved. To avoid repetition, details are not described herein again.

The processor is a processor in the terminal described in the foregoing embodiment. The readable storage medium includes a computer-readable storage medium such as a computer read-only memory (ROM), a random access memory (RAM), a magnetic disk, or an optical disc.

An embodiment of this application further provides a chip, where the chip includes a processor and a communication interface, the communication interface is coupled to the processor, and the processor is configured to run a program or instructions of a network-side device to implement the processes of the foregoing method embodiments 200 to 400 for determining PUCCH resource, with the same technical effects achieved. To avoid repetition, details are not described herein again.

It should be understood that the chip mentioned in embodiment of this application may also be referred to as a system on a chip or system-on-chip.

An embodiment of this application further provides a computer program product. The computer program product includes a processor, a memory, and a program or instructions stored in the memory and capable of running on the processor. When the program or instructions are executed by the processor, the processes of the foregoing method embodiments 200 to 400 for determining PUCCH resource are implemented, with the same technical effects achieved. To avoid repetition, details are not described herein again.

It should be noted that in this specification, the terms "include" and "comprise", or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. Furthermore, it should be noted that the scope of the methods and apparatuses in the embodiments of this application is not limited to performing the functions in the order shown or discussed, but may also include performing the functions in a substantially simultaneous manner or in a reverse order depending on the functions involved. For example, the described methods may be performed in an order different from that described, and various steps may be added, omitted, or combined. In addition, features described with reference to some examples may be combined in other examples.

According to the description of the foregoing embodiments, persons skilled in the art can clearly understand that the method in the foregoing embodiments may be implemented by software in combination with a necessary general hardware platform. Certainly, the method in the foregoing embodiments may alternatively be implemented by hardware. However, in many cases, the former is a preferred embodiment. Based on such an understanding, the technical solutions of this application essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A method for determining physical uplink control channel (PUCCH) resource, performed by a terminal, wherein the method comprises:

in a case that multiple semi-persistent scheduling physical downlink shared channels (SPS PDSCHs) are configured or activated on the terminal and feedback information corresponding to at least one target SPS PDSCH in the multiple SPS PDSCHs needs to be reported in one same time unit, determining a first target PUCCH resource, wherein the first target PUCCH resource is used for transmitting the feedback information corresponding to the target SPS PDSCH;

wherein the determining a first target PUCCH resource comprises:

determining the first target PUCCH resource based on a HARQ feedback mode corresponding to the target SPS PDSCH, wherein the HARQ feedback mode comprises at least one of the following:

no feedback of HARQ information;

feedback of HARQ-NACK only; or feedback of HARQ-ACK/NACK;

wherein after the determining the first target PUCCH resource based on a HARQ feedback mode corresponding to the target SPS PDSCH, the method further comprises:

in a case that feedback information corresponding to multiple target SPS PDSCHs needs to be reported in one same time unit and the HARQ feedback mode corresponding to each of the target SPS PDSCHs is feedback of HARQ-NACK only, performing, by the terminal, the following action:

in a case that any target SPS PDSCH in the multiple target SPS PDSCHs requires NACK feedback, reporting NACK based on the first target PUCCH resource, wherein the first target PUCCH resource is used for transmitting feedback information for any SPS group-common PDSCH configured with feedback of HARQ-NACK only.

2. The method according to claim 1, wherein the terminal is configured with a feedback resource, and the feedback resource comprises at least one of the following:

a first resource, which is a PUCCH resource for transmitting feedback information corresponding to first SPS group-common PDSCH, wherein the HARQ feedback mode corresponding to the first SPS group-common PDSCH is feedback of HARQ-ACK/NACK;

a second resource, which is a PUCCH resource for transmitting feedback information corresponding to second SPS group-common PDSCH, wherein the HARQ feedback mode corresponding to the second SPS group-common PDSCH is feedback of HARQ-NACK only; or a third resource, which is a PUCCH resource for transmitting feedback information corresponding to SPS unicast PDSCH.

3. The method according to claim 1, wherein the step of determining the first target PUCCH resource based on a HARQ feedback mode corresponding to the target SPS PDSCH comprises at least one of the following:

in a case that the HARQ feedback mode corresponding to the target SPS PDSCH is feedback of HARQ-ACK/NACK and the target SPS PDSCH is an SPS group-common PDSCH, determining the first target PUCCH resource based on the number of bits of HARQ-ACK/NACK corresponding to the target SPS PDSCH;

in a case that the HARQ feedback mode corresponding to the target SPS PDSCH is feedback of HARQ-NACK only and the target SPS PDSCH is an SPS group-common PDSCH, determining a second PUCCH resource as the first target PUCCH resource, wherein the second PUCCH resource is used for transmitting feedback information for any SPS group-common PDSCH configured with feedback of HARQ-NACK only.

4. The method according to claim 1, wherein after the determining the first target PUCCH resource based on a HARQ feedback mode corresponding to the target SPS PDSCH, the method further comprises:

in a case that the at least one target SPS PDSCH comprises a first SPS PDSCH and a second SPS PDSCH and feedback information corresponding to the first SPS PDSCH and feedback information corresponding to the second SPS PDSCH need to be reported in one same time unit, performing, by the terminal, at least one of the following:

reporting HARQ-ACK/NACK corresponding to the first SPS PDSCH based on a first target PUCCH resource corresponding to the first SPS PDSCH;

reporting HARQ-NACK corresponding to the second SPS PDSCH based on a first target PUCCH resource corresponding to the second SPS PDSCH;

reporting feedback information corresponding to a second specified SPS PDSCH based on a first target feedback resource corresponding to the second specified SPS PDSCH, wherein the second specified SPS PDSCH is determined from the first SPS PDSCH and the second SPS PDSCH based on second information;

in a case that feedback information corresponding to the second SPS PDSCH is not NACK, reporting HARQ-ACK/NACK corresponding to the first SPS PDSCH based on a first target feedback resource corresponding to a third specified SPS PDSCH, wherein the third specified SPS PDSCH is determined from the first SPS PDSCH and the second SPS PDSCH based on third information; or reporting HARQ-ACK/NACK corresponding to the first SPS PDSCH and HARQ-NACK corresponding to the second SPS PDSCH based on a first target PUCCH resource corresponding to the first SPS PDSCH; wherein a HARQ feedback mode corresponding to the first SPS PDSCH is feedback of HARQ-ACK/NACK, and a HARQ feedback mode corresponding to the second SPS PDSCH is feedback of HARQ-NACK only.

5. The method according to claim 4, wherein the first SPS PDSCH comprises SPS group-common PDSCH or SPS unicast PDSCH, and the second SPS PDSCH comprises SPS group-common PDSCH.

6. The method according to claim 1, wherein after the determining the first target PUCCH resource based on a HARQ feedback mode corresponding to the target SPS PDSCH, the method comprises:

in a case that the at least one target SPS PDSCH comprises a third SPS PDSCH and a fourth SPS PDSCH and feedback information corresponding to the third SPS PDSCH and feedback information corresponding to the fourth SPS PDSCH need to be reported in one same time unit, performing, by the terminal, the following action:

multiplexing and then reporting the feedback information corresponding to the third SPS PDSCH and the feedback information corresponding to the fourth SPS PDSCH; wherein the third SPS PDSCH is an SPS group-common PDSCH, and the fourth SPS PDSCH is an SPS unicast PDSCH.

7. The method according to claim 6, wherein the step of multiplexing and then reporting the feedback information corresponding to the third SPS PDSCH and the feedback information corresponding to the fourth SPS PDSCH comprises:

in a case that the third SPS PDSCH and the fourth SPS PDSCH correspond to different PUCCH configurations, performing at least one of the following:

in a case that at least one fourth PUCCH resource is configured in a PUCCH configuration corresponding to the fourth SPS PDSCH, selecting a second target PUCCH resource from the at least one fourth PUCCH resource based on the number of bits of target HARQ-ACK, and reporting the target HARQ-ACK based on the second target PUCCH resource;

in a case that no fourth PUCCH resource is configured in a PUCCH configuration corresponding to the fourth SPS PDSCH but a fifth PUCCH resource is configured in a PUCCH configuration corresponding to the third SPS PDSCH, selecting a second target PUCCH resource from the at least one fifth PUCCH resource corresponding to the third SPS PDSCH based on the number of bits of target HARQ-ACK, and reporting the target HARQ-ACK based on the second target PUCCH resource;

in a case that no fifth PUCCH resource is configured in a PUCCH configuration corresponding to the third SPS PDSCH and no fourth PUCCH resource is configured in a PUCCH configuration corresponding to the fourth SPS PDSCH, reporting HARQ-ACK corresponding to the third SPS PDSCH based on a first target PUCCH resource corresponding to the third SPS PDSCH, or reporting HARQ-ACK corresponding to the fourth SPS PDSCH based on a first target PUCCH resource corresponding to the fourth SPS PDSCH;

in a case that no fifth PUCCH resource is configured in a PUCCH configuration corresponding to the third SPS PDSCH and no fourth PUCCH resource is configured in a PUCCH configuration corresponding to the fourth SPS PDSCH, reporting target HARQ-ACK based on a first target PUCCH resource corresponding to the third SPS PDSCH, or reporting target HARQ-ACK based on a PUCCH resource corresponding to the fourth SPS PDSCH;

in a case that at least one fifth PUCCH resource is configured in PUCCH configuration corresponding to the third SPS PDSCH, selecting a second target PUCCH resource from the at least one fifth PUCCH resource based on the number of bits of target HARQ-ACK, and reporting the target HARQ-ACK based on the second target PUCCH resource; or in a case that no fifth PUCCH resource is configured in a PUCCH configuration corresponding to the third SPS PDSCH but a fourth PUCCH resource is configured in a PUCCH configuration corresponding to the fourth SPS PDSCH, selecting a second target PUCCH resource from the at least one fourth PUCCH resource corresponding to the fourth SPS PDSCH based on the number of bits of target HARQ-ACK, and reporting the target HARQ-ACK based on the second target PUCCH resource; wherein the fourth PUCCH resource is used for reporting HARQ-ACK corresponding to SPS unicast PDSCH, the fifth PUCCH resource is used for reporting HARQ-ACK corresponding to SPS group-common PDSCH, and the target HARQ-ACK is obtained by multiplexing the HARQ-ACK corresponding to the third SPS PDSCH and the HARQ-ACK corresponding to the fourth SPS PDSCH.

8. The method according to claim 7, wherein the feedback information corresponding to the third SPS PDSCH and the feedback information corresponding to the fourth SPS PDSCH have a same priority.

9. The method according to claim 7, wherein in a case that the target HARQ-ACK is obtained by multiplexing the HARQ-ACK corresponding to the third SPS PDSCH and the HARQ-ACK corresponding to the fourth SPS PDSCH, the number of bits of the target HARQ-ACK is processed into a predetermined number of bits.

10. The method according to claim 7, wherein a HARQ feedback mode corresponding to the third SPS PDSCH is feedback of HARQ-ACK/NACK.

11. The method according to claim 1, wherein the method further comprises:

in a case that the feedback information corresponding to the multiple target SPS PDSCHs needs to be reported in one same time unit, constructing a first target codebook in the following ways, wherein the first target codebook is determined based on the feedback information corresponding to the multiple target SPS PDSCHs:

constructing the first target codebook based on a predetermined order, wherein the predetermined order comprises at least one of the following: magnitudes of configuration indexes corresponding to the target SPS PDSCHs, reception timing of the target SPS PDSCHs, or magnitudes of indexes of serving cells where the target SPS PDSCHs are located.

12. The method according to claim 11, wherein the method further comprises:

in a case that the first target codebook and the second target codebook need to be reported in one same time unit, concatenating the second target codebook before the first target codebook, wherein the second target codebook is a HARQ-ACK codebook corresponding to dynamically scheduled PDSCH.

13. A terminal, comprising:

a processor, a memory, and instructions stored in the memory and capable of running on the processor, wherein the instructions, when executed by the processor, implement:

in a case that multiple semi-persistent scheduling physical downlink shared channels (SPS PDSCHs) are configured or activated on the terminal and feedback information corresponding to at least one target SPS PDSCH in the multiple SPS PDSCHs needs to be reported in one same time unit, determining a first target physical uplink control channel (PUCCH) resource, wherein the first target PUCCH resource is used for transmitting the feedback information corresponding to the target SPS PDSCH;

wherein the determining a first target PUCCH resource comprises:

determining the first target PUCCH resource based on a HARQ feedback mode corresponding to the target SPS PDSCH, wherein the HARQ feedback mode comprises at least one of the following:

no feedback of HARQ information;

feedback of HARQ-NACK only; or feedback of HARQ-ACK/NACK;

wherein the instructions, when executed by the processor, further implements following steps after the determining the first target PUCCH resource based on a HARQ feedback mode corresponding to the target SPS PDSCH:

in a case that feedback information corresponding to multiple target SPS PDSCHs needs to be reported in one same time unit and the HARQ feedback mode corresponding to each of the target SPS PDSCHs is feedback of HARQ-NACK only, performing, by the terminal, the following action:

in a case that any target SPS PDSCH in the multiple target SPS PDSCHs requires NACK feedback, reporting NACK based on the first target PUCCH resource, wherein the first target PUCCH resource is used for transmitting feedback information for any SPS group-common PDSCH configured with feedback of HARQ-NACK only.

14. The terminal according to claim 13, wherein the terminal is configured with a feedback resource, and the feedback resource comprises at least one of the following:

a first resource, which is a PUCCH resource for transmitting feedback information corresponding to first SPS group-common PDSCH, wherein the HARQ feedback mode corresponding to the first SPS group-common PDSCH is feedback of HARQ-ACK/NACK;

a second resource, which is a PUCCH resource for transmitting feedback information corresponding to second SPS group-common PDSCH, wherein the HARQ feedback mode corresponding to the second SPS group-common PDSCH is feedback of HARQ-NACK only; or a third resource, which is a PUCCH resource for transmitting feedback information corresponding to SPS unicast PDSCH.

15. The terminal according to claim 13, wherein the determining the first target PUCCH resource based on a HARQ feedback mode corresponding to the target SPS PDSCH comprises at least one of the following:

in a case that the HARQ feedback mode corresponding to the target SPS PDSCH is feedback of HARQ-ACK/NACK and the target SPS PDSCH is an SPS group-common PDSCH, determining the first target PUCCH resource based on the number of bits of HARQ-ACK/NACK corresponding to the target SPS PDSCH;

in a case that the HARQ feedback mode corresponding to the target SPS PDSCH is feedback of HARQ-NACK only and the target SPS PDSCH is an SPS group-common PDSCH, determining a second PUCCH resource as the first target PUCCH resource, wherein the second PUCCH resource is used for transmitting feedback information for any SPS group-common PDSCH configured with feedback of HARQ-NACK only.

16. The terminal according to claim 13, wherein the instructions, when executed by the processor, further implement following steps after the determining the first target PUCCH resource based on a HARQ feedback mode corresponding to the target SPS PDSCH, the method further comprises:

in a case that the at least one target SPS PDSCH comprises a first SPS PDSCH and a second SPS PDSCH and feedback information corresponding to the first SPS PDSCH and feedback information corresponding to the second SPS PDSCH need to be reported in one same time unit, performing, by the terminal, at least one of the following:

reporting HARQ-ACK/NACK corresponding to the first SPS PDSCH based on a first target PUCCH resource corresponding to the first SPS PDSCH;

reporting HARQ-NACK corresponding to the second SPS PDSCH based on a first target PUCCH resource corresponding to the second SPS PDSCH;

reporting feedback information corresponding to a second specified SPS PDSCH based on a first target feedback resource corresponding to the second specified SPS PDSCH, wherein the second specified SPS PDSCH is determined from the first SPS PDSCH and the second SPS PDSCH based on second information;

in a case that feedback information corresponding to the second SPS PDSCH is not NACK, reporting HARQ-ACK/NACK corresponding to the first SPS PDSCH based on a first target feedback resource corresponding to a third specified SPS PDSCH, wherein the third specified SPS PDSCH is determined from the first SPS PDSCH and the second SPS PDSCH based on third information; or reporting HARQ-ACK/NACK corresponding to the first SPS PDSCH and HARQ-NACK corresponding to the second SPS PDSCH based on a first target PUCCH resource corresponding to the first SPS PDSCH; wherein a HARQ feedback mode corresponding to the first SPS PDSCH is feedback of HARQ-ACK/NACK, and a HARQ feedback mode corresponding to the second SPS PDSCH is feedback of HARQ-NACK only.

17. The terminal according to claim 16, wherein the first SPS PDSCH comprises SPS group-common PDSCH or SPS unicast PDSCH, and the second SPS PDSCH comprises SPS group-common PDSCH.

18. The terminal according to claim 13, wherein the instructions, when executed by the processor, further implement following steps after the determining the first target PUCCH resource based on a HARQ feedback mode corresponding to the target SPS PDSCH:

in a case that the at least one target SPS PDSCH comprises a third SPS PDSCH and a fourth SPS PDSCH and feedback information corresponding to the third SPS PDSCH and feedback information corresponding to the fourth SPS PDSCH need to be reported in one same time unit, performing, by the terminal, the following action:

multiplexing and then reporting the feedback information corresponding to the third SPS PDSCH and the feedback information corresponding to the fourth SPS PDSCH; wherein the third SPS PDSCH is an SPS group-common PDSCH, and the fourth SPS PDSCH is an SPS unicast PDSCH.

19. The terminal according to claim 13, wherein the instructions, when executed by the processor, further implement:

in a case that the feedback information corresponding to the multiple target SPS PDSCHs needs to be reported in one same time unit, constructing a first target codebook in the following way, wherein the first target codebook is determined based on the feedback information corresponding to the multiple target SPS PDSCHs:

constructing the first target codebook based on a predetermined order, wherein the predetermined order comprises at least one of the following: magnitudes of configuration indexes corresponding to the target SPS PDSCHs, reception timing of the target SPS PDSCHs, or magnitudes of indexes of serving cells where the target SPS PDSCHs are located.

20. The method according to claim 1, wherein the method further comprises:

in a case that the feedback information corresponding to the multiple target SPS PDSCHs needs to be reported in one same time unit, constructing a first target codebook in the following way, wherein the first target codebook is determined based on the feedback information corresponding to the multiple target SPS PDSCHs:

in a case that the multiple target SPS PDSCHs comprise both SPS group-common PDSCH and SPS unicast PDSCH, constructing a first HARQ-ACK codebook corresponding to the SPS group-common PDSCH and a second HARQ-ACK codebook corresponding to the SPS unicast PDSCH separately, and concatenating the first HARQ-ACK codebook and the second HARQ-ACK codebook to obtain the first target codebook.

\* \* \* \* \*